United States Patent
Smith (10) Patent No.: US 7,555,111 B2
(45) Date of Patent: Jun. 30, 2009

(54) SYSTEM AND METHOD FOR STAR CODE DIALING

(75) Inventor: Benjamin V. Smith, Birmingham, AL (US)

(73) Assignee: AT&T Intellecutal Property I, L.P., Reno, NV (US)

( * ) Notice: Subject to any disclaimer, the term of this patent is extended or adjusted under 35 U.S.C. 154(b) by 215 days.

(21) Appl. No.: 09/995,634

(22) Filed: Nov. 29, 2001

(65) Prior Publication Data

US 2005/0063526 A1    Mar. 24, 2005

(51) Int. Cl.
*H04M 3/42* (2006.01)
(52) U.S. Cl. .............. 379/218.01; 379/207.12; 379/913
(58) Field of Classification Search ............ 379/218.01, 379/207.12, 913, 93.05, 211.02, 210.01, 379/88.17
See application file for complete search history.

(56) References Cited

U.S. PATENT DOCUMENTS

| | | | | |
|---|---|---|---|---|
| 4,757,267 A | * | 7/1988 | Riskin | 379/114.24 |
| 5,272,749 A | * | 12/1993 | Masek | 379/216.01 |
| 5,533,107 A | | 7/1996 | Irwin et al. | 379/201.01 |
| 5,583,925 A | * | 12/1996 | Bernstein | 379/202.01 |
| 5,590,188 A | * | 12/1996 | Crockett | 379/265.02 |
| 5,870,452 A | * | 2/1999 | Hayduk et al. | 379/32.05 |
| 5,878,126 A | * | 3/1999 | Velamuri et al. | 379/219 |
| 6,404,876 B1 | * | 6/2002 | Smith et al. | 379/218.01 |
| 6,411,699 B1 | * | 6/2002 | Fleischer et al. | 379/211.02 |
| 2001/0038624 A1 | * | 11/2001 | Greenberg et al. | 370/352 |

\* cited by examiner

*Primary Examiner*—Curtis Kuntz
*Assistant Examiner*—Karen L Le
(74) *Attorney, Agent, or Firm*—Withers & Keys, LLC (57) ABSTRACT

A system and method that enables callers to dial a subscription code instead of a telephone number to reach a subscriber of the subscription code. The system includes a lookup table that associates the subscription code with the subscriber's telephone number. The system also uses a routing device that is in communication with the lookup table. The routing device is adapted to receive calls that were initiated by callers using the subscription code. When a call originated by a caller using the subscription code is received by the routing device, the routing device reviews the lookup table to retrieve the telephone number that is associated with the subscription code. The telephone number is then used by the routing device to terminate the call to the telephone number.

6 Claims, 8 Drawing Sheets

SYSTEM AND METHOD FOR STAR CODE DIALING

BACKGROUND

1. Field of the Invention

The present invention relates generally to a system and method for routing a telephone call, and more particularly, to a system and method for routing a telephone call initiated by a caller using a subscription code instead of a telephone number of a subscriber.

2. Background of the Invention

As known in the art, the 800 (including 888, 877, and the like) numbers are not real telephone numbers that are dedicated to specific telephone lines. Rather, each 800 number is simply a 10-digit number that is associated with one or more real telephone numbers in a database. In an advanced intelligent network (AIN), the 800 call routing service is implemented by creating a database at a service control point (SCP). The database at the SCP (referred herein as "the 800 database") identifies a forwarding telephone number (or the route-to number) of the subscriber when a caller dials an 800 number that is associated with the forwarding telephone number.

Callers like to use 800 numbers because they are toll free numbers. Businesses, organizations, and even individuals subscribe to 800 numbers for different reasons. One reason that motivates subscribers to have 800 numbers is that they can choose a number combination representing a catchy word that is easy for callers to remember. For example, 800-CAR-RENT and 800-HOLIDAY are two numbers that have been subscribed to by a car rental franchise and a hotel chain, respectively. Callers in need of the services described by the toll free number are more likely to contact the subscriber than other businesses. In other words, a customer in need of a rental vehicle is more likely to call the car rental franchise with the 1-800-CAR-RENT toll free number than other rental entities with nondescript telephone numbers.

As widely known in the art, each of the 800 numbers has ten digits including one of the 800, 888, 877, and 866 NPA designations. Accordingly, a caller must dial at least ten digits to reach the desired called party. This has often created a frustration among callers who must associate each letter of the 800 number with a number on the key pad of a telephone set. Thus, there is a need for a system and method that provides similar benefits of the 800 numbers without requiring callers to dial at least ten digits.

SUMMARY OF THE INVENTION

The present invention is a system and method for routing a telephone call initiated by a caller using a subscription code to a subscriber of the subscription code. Preferably, the subscription code includes one character and fewer than five digits. Preferably, the subscription code is a dial string having an asterisk followed by three or four digits. Preferably, the digits represent an easy to remember catchy word. One specific example of the subscription code is *838, where 838 corresponds with "VET" on the keypad of a telephone set. Probable subscribers of this specific subscription code are veterinarians and animal hospitals.

In one embodiment of the present invention, each subscription code is associated with one telephone number of one subscriber. In another embodiment, each subscription code can be associated with two or more telephone numbers of the same subscriber with instructions regarding which of the telephone numbers should be used to terminate a call. In still another embodiment, each subscription code can be associated with two or more subscribers each of whom may have more than one telephone number.

A preferred system of the present invention includes a lookup table and a routing device. The lookup table contains relationships between subscription codes and telephone numbers. Furthermore, each of the subscription codes can be associated with subscriber rules that provide instructions regarding how a call should be terminated. The subscriber rules are especially important if a subscription code is associated with more than one telephone number.

The routing device is adapted to process a call that is initiated by a caller using one of the subscription codes. When the routing device receives the call, it consults the lookup table for a subscriber telephone number that is associated with or related to the subscription code. The routing device can then terminate the call using the subscriber telephone number. The lookup table is preferably stored in a database that is accessible to the routing device.

A method of the present invention that is implemented in an AIN includes the following steps. First, a call initiated by a caller using a subscription code of the present invention is detected at a service switching point (SSP). The SSP then queries an SCP for call routing instructions. Next, the SCP consults a database to obtain a subscriber telephone number that is associated with the subscription code. The SCP then returns to the SSP a message that includes the subscriber telephone number. Finally, the SSP terminates the call using the subscriber telephone number.

DETAILED DESCRIPTION OF THE INVENTION

Figure 1:
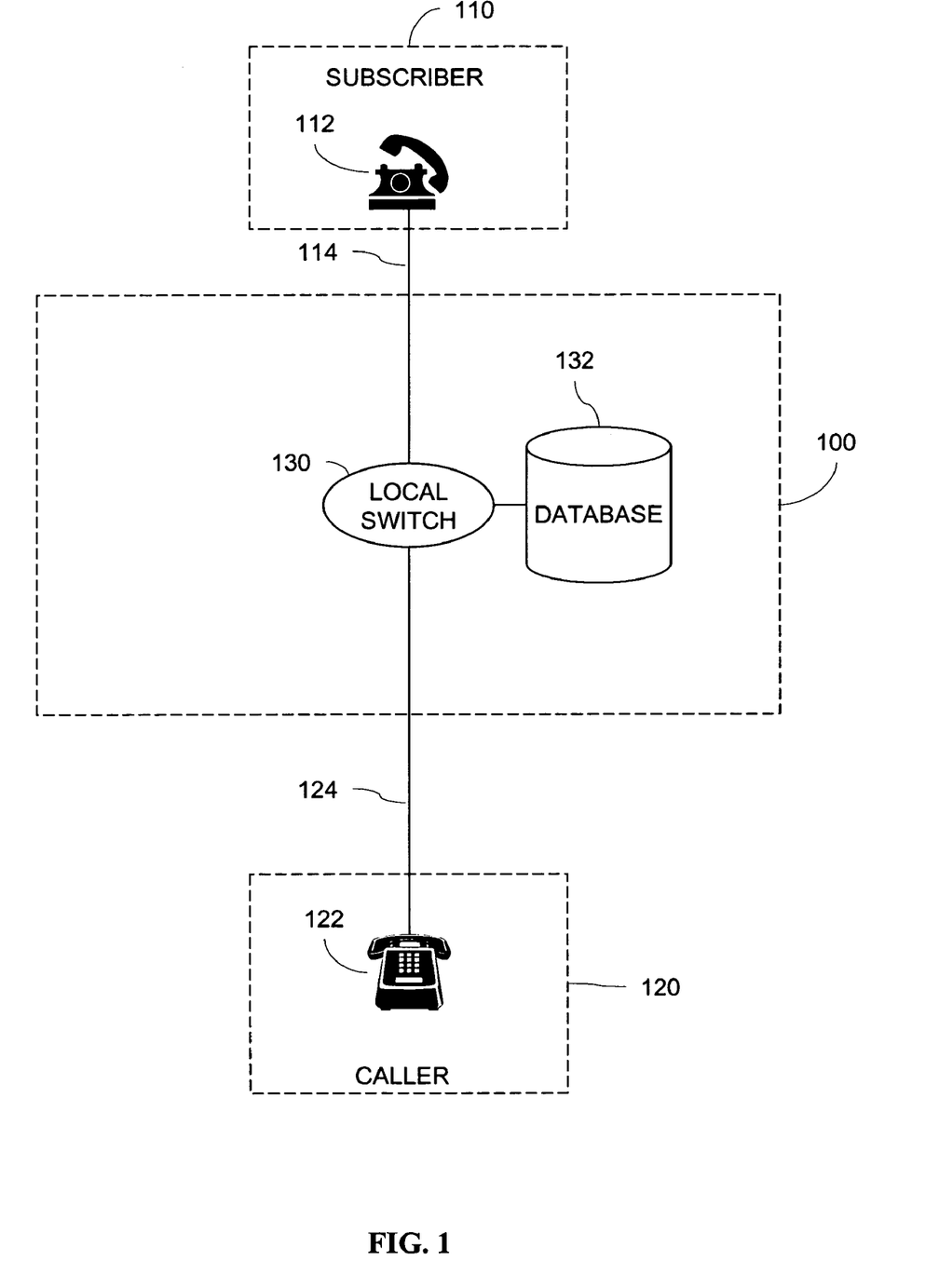
FIG. 1 is a schematic diagram illustrating the system architecture of an embodiment of the present invention in which a local switch is utilized as a routing device of the present invention.

FIG. 1 is a schematic diagram showing an embodiment of the system architecture of the present invention. Local switch 130 is used in conjunction with other components of telephone network 100 to act as the routing device of the present invention. Local switch 130 may be any of several types of suitable telecommunications switches. Examples of suitable local switches include any Class 5 switches, such as model 5ESS manufactured by Lucent Technologies and model DMS-100 manufactured by Nortel Networks. Although local switch 130 is shown in FIG. 1 to be directly connected to telephone lines 114 and 124, other switches (not shown) within telephone network 100 may act as intermediaries between telephone lines 114 and 124 and local switch 130.

As shown in FIG. 1, local switch 130 is connected to customer premises equipment (CPE) 112 of subscriber 110. Similarly, local switch 130 is connected to CPE 122 of caller 120. CPE 112 and CPE 122 may be any suitable telecommunications equipment. For example, CPE 112 and CPE 122 may be telephone sets. As would be apparent to one skilled in the art, the present invention may be adapted for use in a wireless telephone network in which one or both CPE 112 and 122 are wireless devices.

The system preferably includes a database. For example, local switch 130 has access to database 132. Database 132 preferably includes a lookup table. The lookup table preferably relates a subscription code subscribed by subscriber 110 to a telephone number of subscriber 110. In this embodiment, when caller 120 uses the subscription code to initiate a call using CPE 122, local switch 130 retrieves the telephone number from database 132 for terminating the call to subscriber 110.

Figure 2:
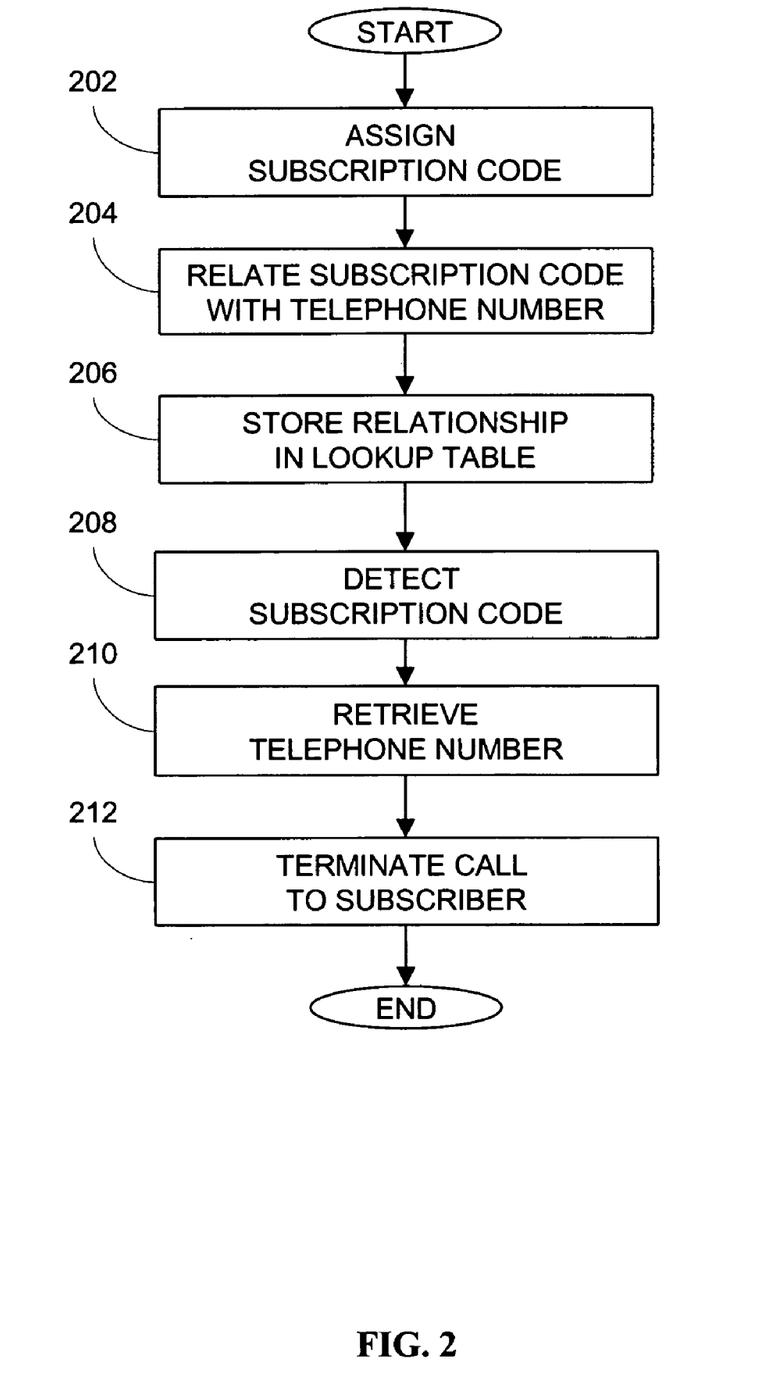
FIG. 2 is a flowchart illustrating exemplary steps involved in using one embodiment of the present invention in which a local switch is utilized as a routing device of the present invention.

FIG. 2 is a flowchart illustrating exemplary steps involved in using one embodiment in accordance with the system architecture shown in FIG. 1.

In step 202, subscriber 110 is assigned or provided with a subscription code. Subscriber 110 may obtain the subscription code from a service provider of the present invention. The subscription code is a dial string having one or more characters and numbers that can be composed using the keypad of CPE 122. Preferably, the subscription code includes the asterisk ("*") character followed by three or four digits. In an example in which subscriber 110 is John Vet, a veterinarian, the subscription code may be, for example, "*VET" which can be composed using the sequence of *-8-3-8 keys. In a different example, if subscriber 110 is ACME Barber Shop, the subscription code may be, for example, "*HAIR" or "*4247".

Examples of other subscription codes are listed in Table 1.

TABLE 1

Examples of Subscription Codes

| Subscription Codes | Potential Subscribers |
| --- | --- |
| *HVAC, *COOL, *HEAT | HVAC service providers |
| *PIPE, *WATER | Plumbers |
| *MALL | Shopping centers |
| *SHOW | Theatres |
| *LOAN, *BANK | Banks |
| *ROCK | Radio stations |
| *CAR | Auto repair shops |
| *TIRE | Tire stores |
| *FLY | Travel agencies |
| *MEX | Mexican restaurants |
| *FOOD | Restaurants |
| *PIZZA | Pizza deliveries |

A preferred subscription code includes "*" followed by three or four numbers. Longer strings having more than five numbers are not desirable because callers may not find them convenient. Shorter strings are similarly not desirable due to existing services that use two or fewer digits. The subscription code preferably refers to a catchy word that callers can remember easily. For example "VET" is an example of a catchy word for veterinarians and "HAIR" is a catchy word for hairstylists.

It is noted that other characters may be used in lieu of the asterisk. For example, telephone networks can be adapted to recognize other characters, such as @, $, %, and so on to implement the invention. Furthermore, CPE 122 can be adapted to have a specific function key for the present invention.

In step 204, the subscription code is related to or associated with a telephone number of subscriber 110. For example, if John Vet's telephone number is 123-456-7890, and ACME Barber Shop's telephone number is 133-333-3333, then the relationship may be represented by the service provider in a lookup table. Table 2 below is an example of the lookup table.

TABLE 2

An Example of a Lookup Table

| Subscription codes | Subscribers | Subscriber Telephone Numbers |
| --- | --- | --- |
| *VET (*838) | John Vet | 123-456-7890 |
| HAIR (*4841) | ACME Barber Shop | 133-333-2333 |

In step 206, the relationship between the subscription code and the subscriber telephone number may be stored in a memory accessible by local switch 130. Preferably, the relationship is stored in a database. The database may be database 132 as shown in FIG. 1. In other words, in a specific example, Table 2 above is stored in database 132 that is accessible to local switch 130.

In step 208, when caller 120 uses CPE 122 to dial a subscription code, e.g., "*VET", local switch 130 recognizes that the call is intended for a service subscriber of the present invention because of the dial string. Any known technology may be used to enable local switch 130 to recognize the dial string as the subscription code of the present invention. For example, local switch 130 can be adapted to generate a query based on the subscription code which includes the asterisk.

In step 210, local switch 130 consults database 132 using the subscription code. For example, local switch 130 may be programmed to access the lookup table (e.g., Table 2) that contains the relationship between the subscription code and the subscriber telephone number. Using "*VET", for example, the subscriber telephone number of "123-456-7890" may be retrieved by local switch 130 from database 132.

In step 212, using the subscriber telephone number retrieved in step 210, local switch 130 terminates the call from caller 120 to subscriber 110. Thus, in a situation in which caller 110 dials *VET to look for a veterinarian, caller 110 would be connected to John Vet who subscribes to the *VET subscription code. One of the benefits that John Vet receives from the present invention is that all potential customers who dials the easy to remember *VET subscription code would be connected to him.

Figure 3:
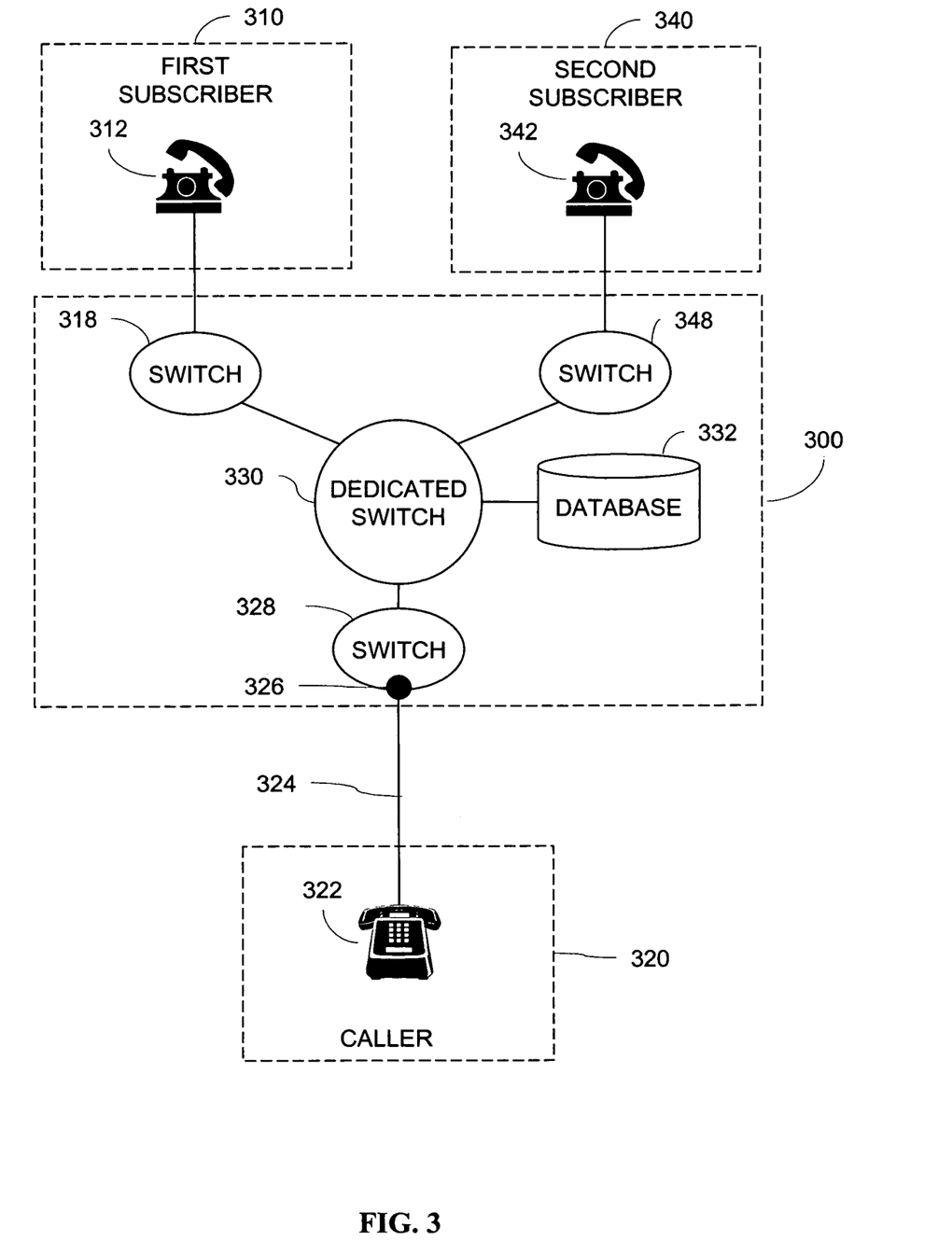
FIG. 3 is a schematic diagram illustrating the architecture of another embodiment of the present invention in which a dedicated switch is utilized as a routing device of the present invention.

FIG. 3 is a schematic diagram showing the system architecture of another embodiment of the present invention. In this embodiment, a service provider of the present invention may assign a subscription code to more than one subscribers. For example, in FIG. 3, first subscriber 310 and second subscriber 340 are both subscribers of one common subscription code. Preferably, the common subscription code is not assigned to more than five subscribers.

Telephone network 300 has a number of switches including, for example, switches 318, 328, and 348. Each of switches 318, 328, and 348 may be one that which is typically used in central offices for routing telephone calls. Switch 318 is connected to CPE 312 of first subscriber 310. Similarly, switch 328 is connected to CPE 322 of caller 320, and switch 348 is connected to CPE 342 of second subscriber 340.

Although it is shown in FIG. 3 that first subscriber 310, caller 320, and second subscriber 340 are connected to three different switches, it is possible that fewer than three switches may be involved. For example, one or more of first subscriber 310, caller 320, and second subscriber 340 may be sharing a common switch.

CPE 312, CPE 322, and CPE 342 may be any suitable telecommunications equipment. For example, CPE 312, CPE 322, and CPE 342 may be telephone sets or personal computers. As it would be apparent to one skilled in the art, the present invention may be adapted for use in a wireless telephone network.

The system preferably includes a database. For example, database 332 may be provided so that it is accessible by dedicated switch 330 or any or the switches 318, 328, and 348. Database 332 contains a lookup table. The lookup table preferably contains subscriber information. The subscriber information may include, for example, subscriber rules or conditions regarding which of the subscribers should receive the call. Table 3 below is an example of the lookup table.

TABLE 3

A Lookup Table for
Multiple Subscribers per Subscription Code

| Subscription Codes | Conditions | Subscribers |
| --- | --- | --- |
| *PIPE | Originating Region No. 1 | First Subscriber 310 |
|  | Originating Region No. 2 | Second Subscriber 340 |
| *SHOW | Time Period No. 1 | First Subscriber 310 |
|  | Time Period No. 2 | Second Subscriber 340 |

In this embodiment, if a call is originated by caller 320 using a subscription code that is subscribed by more than one subscriber, the conditions in the lookup table would determine which of the subscribers should receive the call. Referring to Table 3, in an example in which the *PIPE subscription code is associated with two plumbers, namely, first subscriber 310 and second subscriber 340, the condition may depend on within which originating region caller 320 is located. The originating region may be determined, for example, using caller 320's NPA-NXX designation or the originating point code associated with caller 320. Alternatively, other means may be used, including matching the zip codes and/or GPS coordinates of caller 320 with those of the subscribers. It is noted that many different conditions may be used. For instance, in another example in which caller 320 uses *SHOW to contact a theatre, the condition may depend on the time at which the call is initiated, i.e., the time when caller 320 dials the subscription code.

Preferably, dedicated switch 330 is used as the routing device in this embodiment. The preferred dedicated switch for use in this embodiment can be any Class 5 switches. A call initiated by a caller using a subscription code of the present invention is routed to dedicated switch 330 by the local switch that is connected to the caller.

Detection of the call at the local switch may be accomplished in one of several ways. For example, a trigger may be provisioned at each local switch. Referring to FIG. 3, for example, trigger 326 is provisioned on telephone line 324 at local switch 328. Trigger 326 can be a customized dialing plan (CDP) trigger. Trigger 326 may also be a public office dialing plan (PODP) trigger. Trigger 326 is adapted to detect the subscription codes used in the present invention. For example, when caller 320 dials a subscription code of the present invention, the call is routed to dedicated switch 330, which in turns retrieves a telephone number associated with the subscription code from database 332. However, if more than one telephone number is associated with the subscription code, only one telephone number will be retrieved depending on the conditions specified in database 332.

Figure 4:
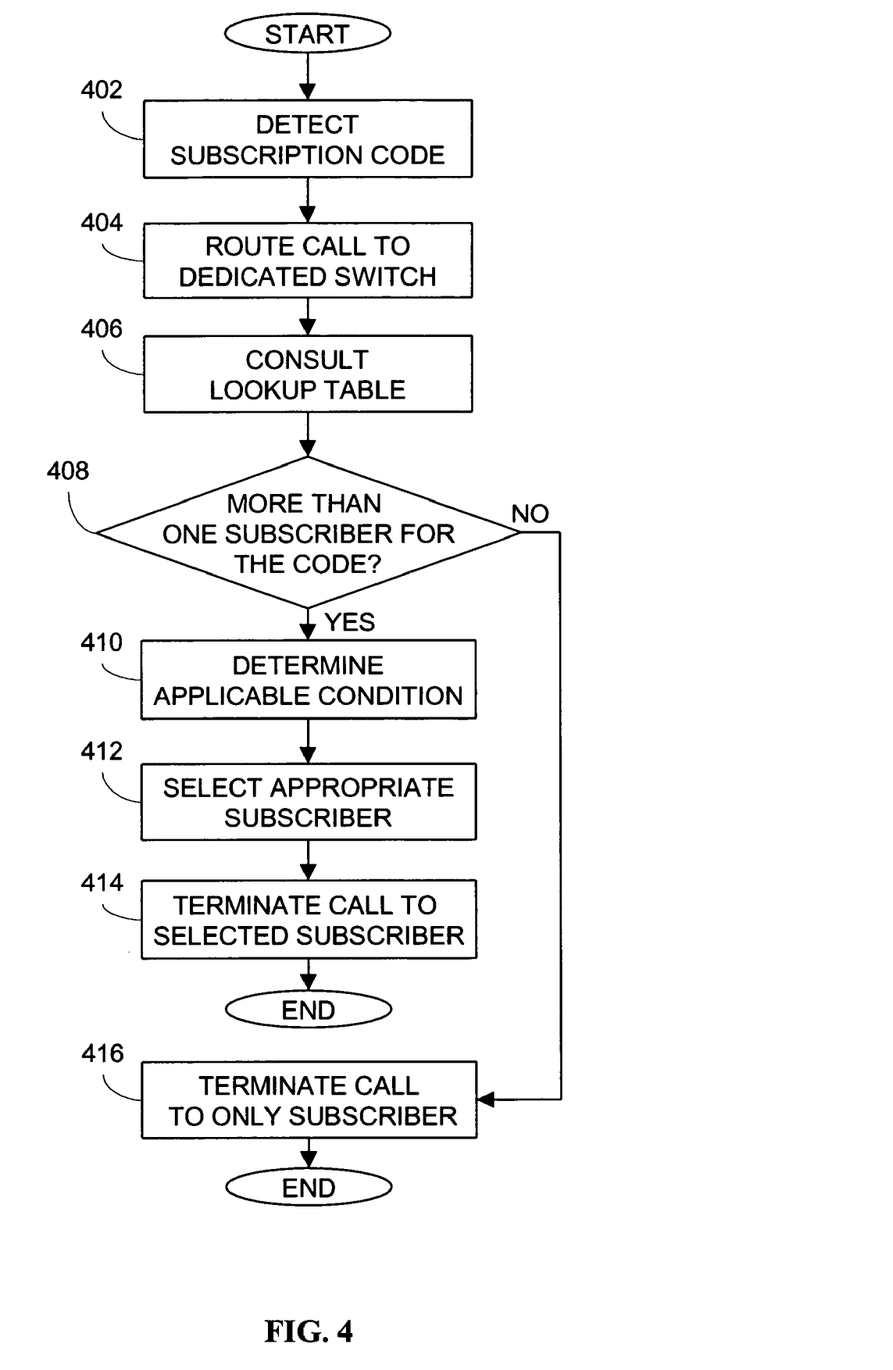
FIG. 4 is a flowchart illustrating exemplary steps involved in using another embodiment of the present invention in which a dedicated switch is utilized as a routing device of the present invention.

FIG. 4 is a flowchart illustrating exemplary steps involved in using another embodiment of the present invention in which more than one subscriber telephone number is associated with one subscription code as described above in FIG. 3.

In step 402, when caller 320 dials a subscription code, for example, *PIPE is dialed, the subscription code is detected by switch 328. As stated above, detection may be done by trigger 326.

In step 404, the call is routed by switch 328 to dedicated switch 330.

In step 406, at dedicated switch 330, the lookup table in database 332 is consulted.

In step 408, it is determined whether the subscription code detected in step 402 is associated with more than one subscriber telephone number. If more than one subscriber telephone number is associated with the subscription code, the process goes to step 410. Otherwise, the process continues in step 416, in which the call is terminated to the only telephone number associated with the subscription code.

In step 410, it is determined which condition associated with the subscription code applies. For example, if the subscription code *PIPE were used by caller 320 then dedicated switch 330 determines the originating region of the call. If instead the subscription code *SHOW were used, then dedicated switch 330 reviews the time at which the call was placed by caller 320.

In step 412, based on the condition determined in step 410, an appropriate subscriber telephone number is selected. For example, if it is determined that caller 320 who dialed *PIPE is located in Originating Region No. 1, then first subscriber 310 would be the appropriate subscriber whose telephone number must be selected. On the other hand, if caller 320 is from Originating Region No. 2, then second subscriber 340's telephone number should be selected.

In step 414, the telephone number selected in step 412 is used by dedicated switch 330 to route or terminate the call originated by caller 320 to one of first subscriber 310 and second subscriber 340 based on the condition determined in step 410.

Figure 5:
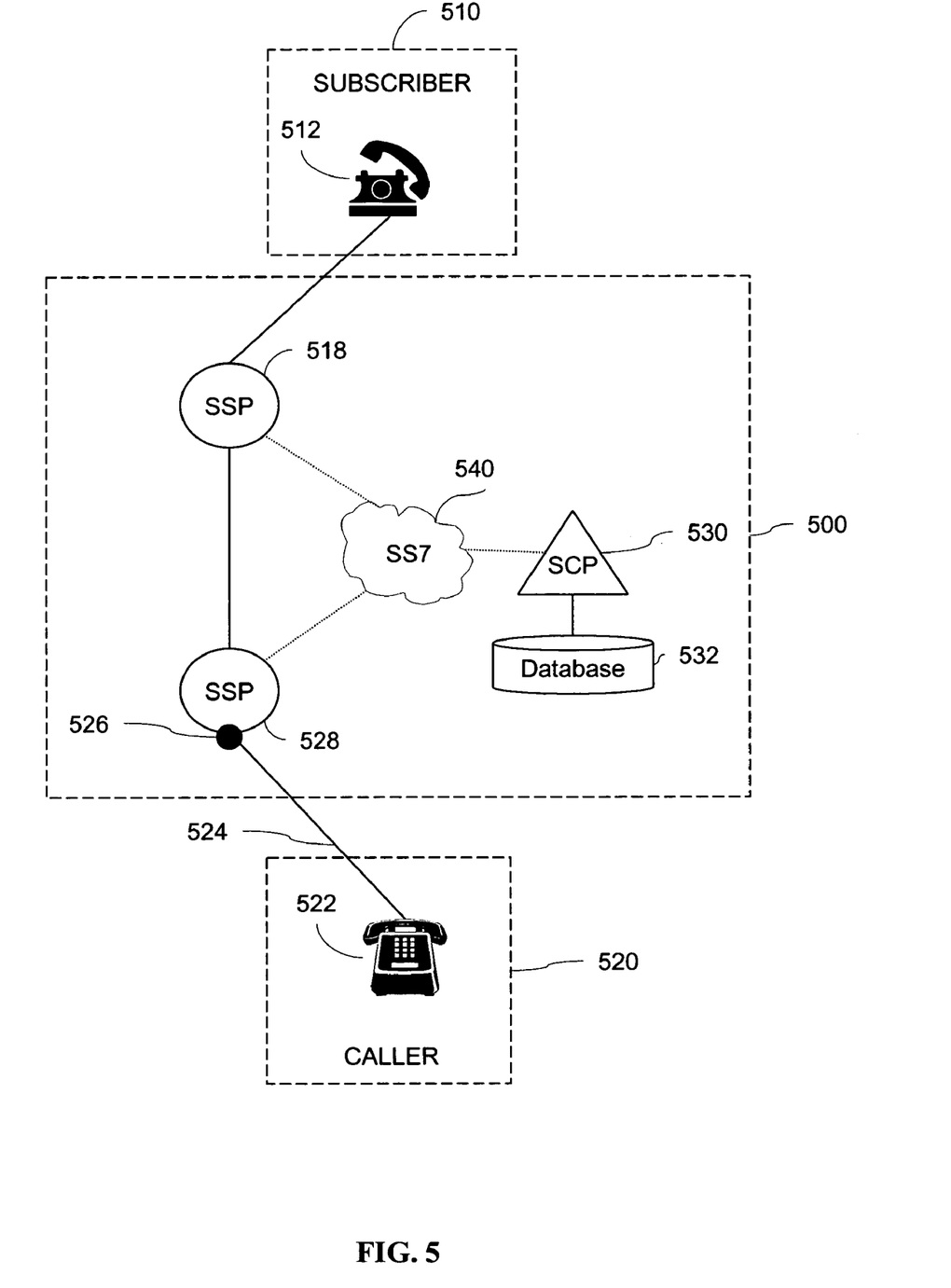
FIG. 5 is a schematic diagram illustrating the architecture of another embodiment of the present invention as implemented in an AIN.

FIG. 5 is a schematic diagram showing the system architecture of another embodiment as implemented in an AIN. It is noted that although a preferred embodiment of the invention is described herein in the context of an AIN, the invention may be adapted for many other telephone systems or networks. The AIN is described in U.S. Pat. Nos. 5,701,301, and 5,838,774, each of which is incorporated herein by reference in its entirety.

Telephone network 500 may include, among other components, SSP 518, SSP 528, and SCP 530. SCP 530 can be a typical service control point having access to database 532. Signaling between SCP 530 and one of SSP 518 and SSP 528 may be channeled through signaling system 540. Signaling system 540 may be any suitable signaling system. In the preferred embodiment, signaling system 540 is the well known SS7 signaling system.

SCP 530 has access to database 532. Database 532 contains subscriber information. The subscriber information contains a relationship linking one or more telephone numbers of subscriber 510 and a subscription code of the present invention. A query from SSP 528 can be adapted to carry the subscription code and a translation type. The translation type is used to identify SCP 530 that handles the service of the present invention.

SSP 518 is communication with CPE 512 of subscriber 510. Similarly, SSP 528 is in communication with CPE 522 of caller 520. CPE 512 and CPE 522 may be telephone sets that can be used to make and receive telephone calls. As it is understood, the present invention may be adapted for a wireless telephone network.

Trigger 526 is provisioned on telephone line 524 at SSP 528. Trigger 526 can be a CDP trigger. Alternatively, trigger 526 may be a PODP trigger.

In this embodiment, when a call initiated using the subscription code is detected by trigger 526 and a query is launched by SSP 528 to SCP 530, SCP 530 retrieves a telephone number of subscriber 510 that is associated with the subscription code dialed by caller 520. The telephone number is then used by SSP 528 to terminate the call to subscriber 510.

Figure 6:
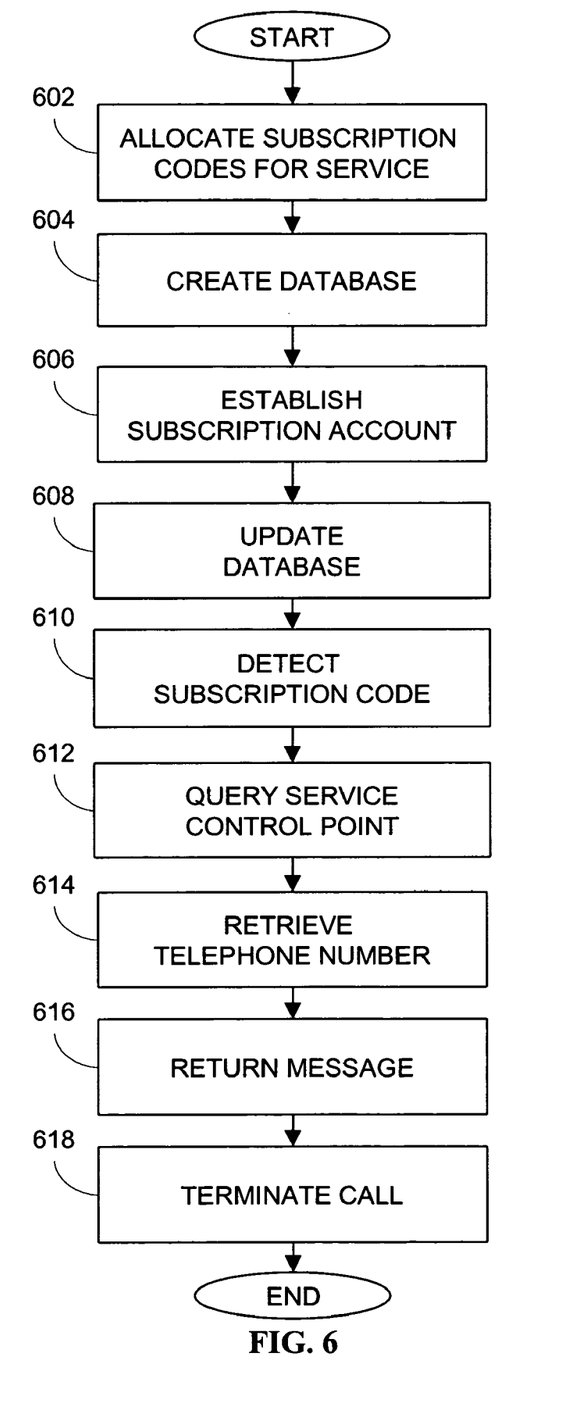
FIG. 6 is a flowchart illustrating exemplary steps involved in using another embodiment of the present invention as implemented in an AIN.

FIG. 6 is a flowchart illustrating exemplary steps involved in using one embodiment of the present invention as implemented in the AIN shown in FIG. 5.

In step 602, telephone network 500 assigns, allocates, or otherwise makes available a block of subscription codes to implement the present invention. The subscription code preferably has a common prefix. For example, the "*" (asterisk) character may be used as the prefix so that all subscription codes have the *XXXX format, where XXXX represents three to four digits. Preferably, the XXXX number string can be used to represent a catchy word. Exemplary catchy words are previously described including those listed in Table 1 above.

In step 604, telephone network 500 creates database 532. Database 532 may be hereinafter referred to as the subscription code database. Database 532 is accessible to SCP 530.

In step 606, telephone network 500 establishes subscription accounts with its customers, including subscriber 510. As part of the subscription, subscriber 510 is provided with a subscription code allocated in step 602. Alternatively, subscriber 510 may be given an opportunity to designate his or her own favorite subscription code. If the subscriber-designated subscription code is available, i.e., not in conflict with any existing subscription codes already in database 532, the subscriber-designated subscription code may be used.

The account may be maintained by subscriber 510 based on any of several suitable payment schemes. For example, subscriber 510 may pay telephone network 500 a premium fee for an exclusive use of the subscription code. Subscriber 510 may also pay telephone network 500 a smaller fee if subscriber 510 is willing to share the subscription code with one or more other subscribers. In addition, subscriber 510 may pay telephone network 500 based on the number of calls received using the subscription code service.

In step 608, telephone network 500 updates database 532. In this step, the subscription code assigned to or designated by subscriber 510 is associated with a telephone number of subscriber 510. The association of the subscription code and the telephone number may be listed in a lookup table that is stored in database 532. Examples of the lookup table are shown in Tables 2 and 3 above.

In step 610, when caller 520 dials the subscription code that has been associated with the telephone number of subscriber 510 in database 532, the call is detected by trigger 526, which is at SSP 528.

In step 612, SSP 528 launches a query to SCP 530. The query is preferably an Info_Analyze query. The query includes, among other information, a translation type that is associated with the subscription code and that identifies SCP 530. The query may also include other information, including for example, the calling party number which is the telephone number of caller 520. The query may also include the originating point code associated with caller 520. More importantly, the query contains the dial string of the subscription code. All this information is contained within the TCAP message.

In step 614, through the use of an appropriate service application package, SCP 530 uses the information within the TCAP message of the Info_Analyze query to look up the associated subscriber telephone number in database 532 and to respond.

In step 616, SCP 530 returns a message to SSP 528 with instructions regarding how SSP 528 should terminate the call. The message is preferably an Analyze_Route message that contains the telephone number of subscriber 510.

In step 618, SSP 528 terminates the call from caller 520 to subscriber 510. In this example, a call is established between caller 520 and subscriber 510 via SSP 528 and SSP 518. As a result, subscriber 510 can receive a call from caller 520 without requiring caller 520 to ever know the subscriber telephone number of subscriber 510. Here, caller 520 simply needs to remember the subscription code, which can be a short string with a catchy word that is easy to remember.

Figure 7:
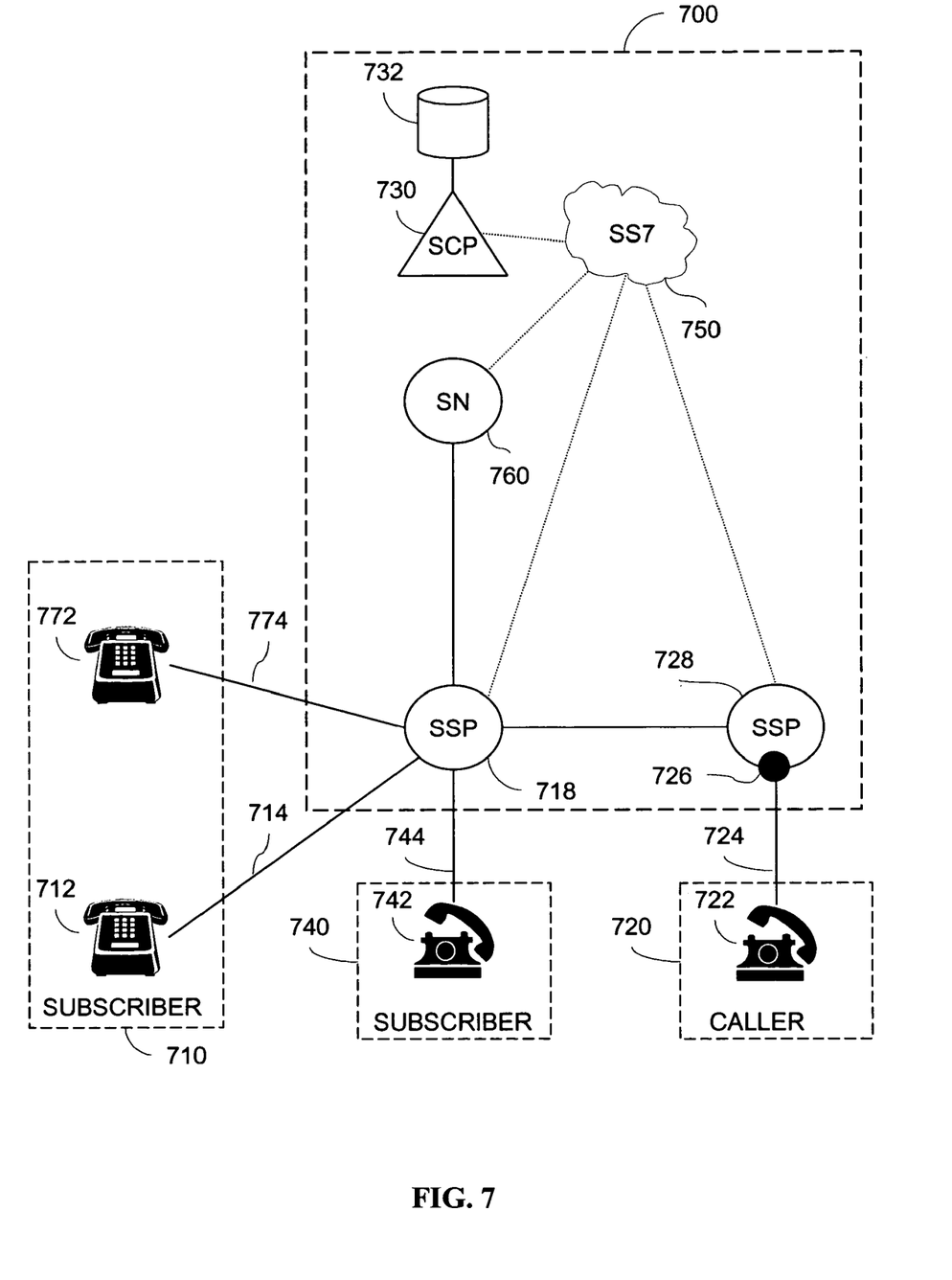
FIG. 7 is a schematic diagram illustrating the architecture of another embodiment of the present invention as implemented in an AIN.

FIG. 7 is a schematic diagram showing a system architecture of another embodiment of the invention as implemented in an AIN. Telephone network 700 includes SCP 730, database 732, service node (SN) 760, signaling network 750, SSP 718, trigger 726, and SSP 728.

Subscribers 710 and 740 are customers or service subscribers of the invention. Subscriber 710 is a multi-member subscriber having telephone lines 714 and 774. A multi-member subscriber may be, for example, an entity having multiple telephone numbers associated with one subscription code. Subscriber 740 is a regular subscriber having telephone line 744.

In this embodiment, telephone lines 714, 774, and 744 are associated with a single, common subscription code. In this embodiment, one or both of SCP 730 and SN 760 may be involved in finding the appropriate telephone line among telephone lines 714, 774, and 744 to terminate a call initiated by caller 720 using the subscription code. Each of telephone lines 714, 774, and 744 is identifiable using a telephone number which is associated with the subscription code in database 732.

Subscriber 710 has CPE 712 and CPE 772, which may be telephone sets or other equipment or devices, such as a computers or cellular telephones, that can initiate or receive communication sessions using telephone lines 714 and 774, respectively. Similarly, subscriber 740 has CPE 742 which may be used to establish communication session using telephone line 744. Although telephone lines 714, 774, and 744 are shown to be connected to a common SSP 718, it is understood that each of telephone lines 714, 774, and 744 can be connected to a different SSP, including SSP 728.

Caller 720 and CPE 722 are in communication with telephone network 700. Caller 720 may be part of telephone network 700. However, caller 720 can also be a member of a telephone network other than telephone network 700. CPE 722 may be a landline telephone, a computer, or a wireless device. In any event, when caller 720 dials the subscription code of the present invention, the call is routed to SSP 728 which is part of telephone network 700.

Detection of calls using the subscription code is detected at SSP 728. Detection of calls initiated using the subscription code can be performed by a trigger at SSP 728. For example, trigger 726 can be adapted to detect calls generated by caller 720. Trigger 726 can be a CDP trigger. Alternatively, trigger 726 can be a PODP trigger.

Preferably, trigger 726 is adapted to detect certain conditions associated with the status of telephone line 724. For example, trigger 726 can be programmed or otherwise adapted to detect the pressing of the "*" button followed by a number of digits on CPE 722. After caller 720 enters the dial string containing the subscription code, trigger 726 sends a query to SCP 730, which processes the query and returns a message. SCP 730 functions similarly to SCP 530. The message from SCP 730 instructs one or both SN 760 and SSP 728 on how the call should be terminated.

Figure 8:
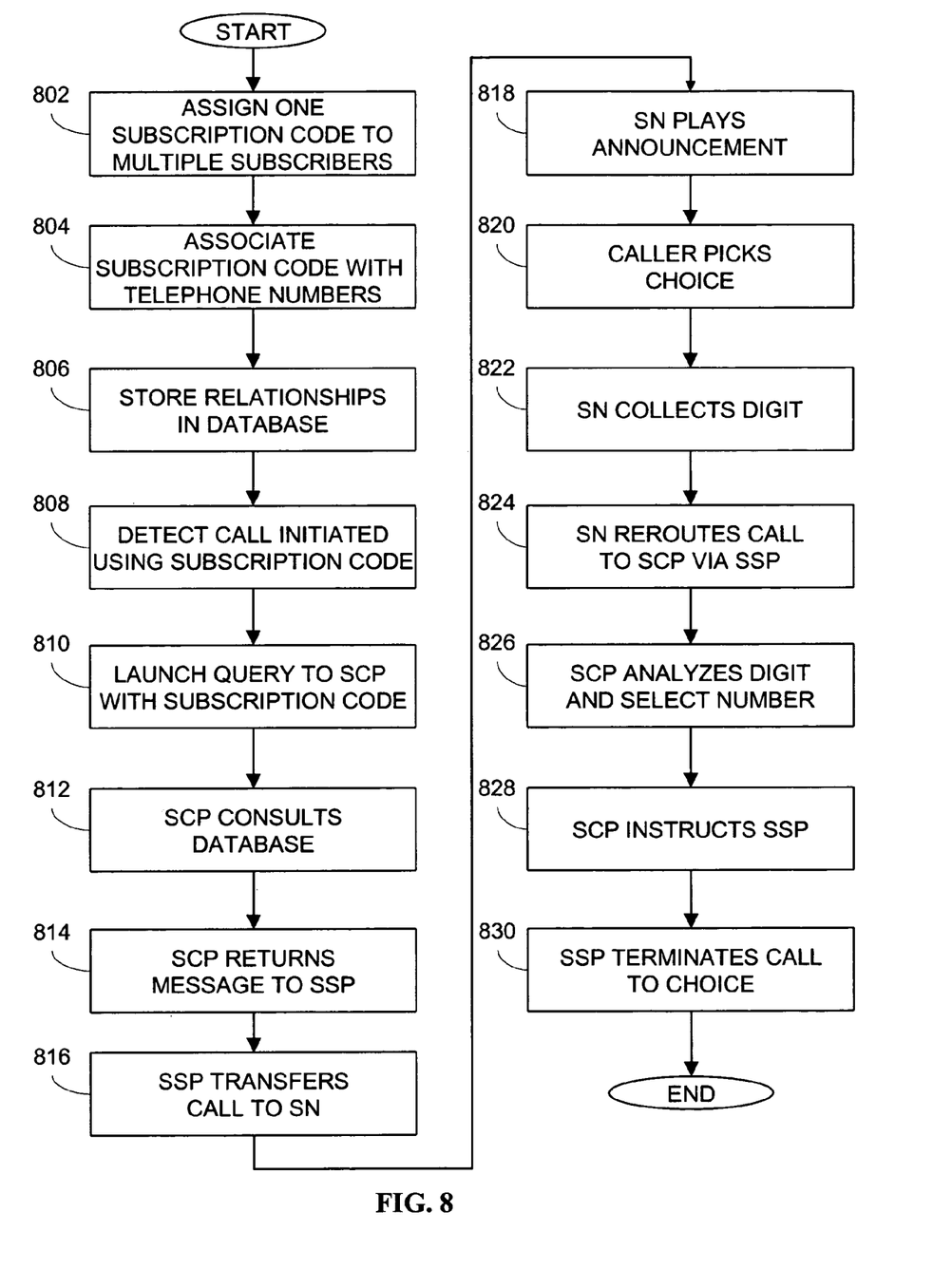
FIG. 8 is a flowchart illustrating exemplary steps involved in using another embodiment of the present invention as implemented in an AIN.

FIG. 8 is a flowchart illustrating exemplary steps involved in using the embodiment shown in FIG. 7.

In step 802, both first subscriber 710 and second subscriber 740 are assigned or provided with a single, common subscription code of the present invention. As stated above, the subscription code preferably includes "*" followed by three or four numbers. To illustrate the operation of the present invention, assume that first subscriber 710 and second subscriber 740 are two different taxi companies serving the area in which caller 320 lives. Assume further than the common subscription code is "*TAXI", which corresponds with the dial string "*8294".

In step 804, the subscription code is related to or associated with subscriber telephone numbers of first subscriber 710 and second subscriber 740. For example, the "*TAXI" subscription code is associated with two telephone numbers of first subscriber 710 and one telephone number of second subscriber 740.

In step 806, the relationship between the subscription code and the subscriber telephone numbers is stored in a memory accessible to SCP 730. For example, the relationship may be stored as a lookup table in database 732, which is accessible to SCP 730. An example of the lookup table may be presented as shown in Table 4 below, which associates the "*TAXI" subscription code with telephone numbers of first subscriber 710 and second subscriber 740. For clarity, assume that first subscriber 710 is Yellow Cab Company and second subscriber 740 is Red Roof Cab Corporation. Assume further that telephone lines 714 and 774 are associated with telephone numbers "714-714-7114" and "774-774-7774," respectively, and telephone line 744 is associated with telephone number "744-744-7444".

TABLE 4

An Example of a Lookup Table

| Subscription codes | Subscribers | Telephone Numbers |
|---|---|---|
| *TAXI (*8834) | Yellow Cab (Downtown) | 714-714-7114 |
| | Yellow Cab (Suburb) | 774-774-7774 |
| | Red Roof Cab | 744-744-7444 |

In step 808, when caller 720 uses CPE 722 to dial subscription code *TAXI", SSP 728 (in conjunction with trigger 726) recognizes that the call is intended for a service subscriber of the present invention because of the format of the dial string.

In step 810, trigger 726 causes SSP 728 to launch a query to SCP 730. The query contains, among other information, the subscription code in the TCAP message.

In step 812, SCP 730 consults database 732. Using the information in the TCAP message, which includes the subscription code, SCP 730 may access, for example, database 732. Database 732 may inform SCP 730 that SN 760 should be used to further process the call.

In step 814, SCP 730 returns a message to SSP 728. The message from SCP 730 to SSP 728 may be, for example, an Analyze_Route message. The message instructs SSP 728 to execute one or more actions.

In step 816, SSP 728 transfers or forwards the call to SN 760 using the information provided by SCP 730 in the message.

In step 818, SN 760 plays an announcement. The announcement is adapted to solicit caller 720 to select one of the subscribers. For example, the announcement may include the following recording: "Please press or say one for Yellow Cab for trips to downtown; press or say two for Yellow Cab for trips to the suburb; and press or say three for Red Roof Cab for trips to anywhere in the metropolitan area."

In step 820, caller 720 listens to the options and responds accordingly. For example, caller 720 presses or says one of "One," "Two," and "Three."

In step 822, SN 760 collects the digit input by caller 720.

In step 824, SN 760 reroutes the call to SCP 730 via SSP 728. The digit collected by SN 760 in step 822 is provided to SCP 730.

In step 826, SCP 730 analyzes the information provided by SN 760. The analysis includes matching the digit collected in step 822 with a subscriber telephone number.

In step 828, SCP 730 returns a message to SSP 728. The message instructs SSP 728 to terminate the call to the subscriber whose telephone number is included in the message.

In step 830, SSP 728 terminates the call to one of the telephone numbers according to the input of caller 720.

In one or more embodiments of the invention, additional or alternative steps may be required. For example, in one embodiment in which *BAR and *CAR are two of the subscription codes, an input from the caller would be necessary to determine whether the caller is trying to call a bar-related subscriber or a car-related subscriber. This step is necessary because both "BAR" and "CAR" are represented by the 2-2-7 key sequence. A switch or a service node can be adapted to solicit the input. For example, the telephone network implementing this embodiment can play an announcement such as, for example, "Please press or say one if you wish to call your neighborhood bar; please press or say two if you wish to contact a car dealership."

Similarly, in one or more embodiments of the invention in which two or more subscribers are associated with one common subscription code, a "round robin" approach may be used to select one of the subscribers. For example, if the "*PIZZA" subscription code is associated with three different competing pizza deliveries, each pizza delivery subscriber will be chosen for every third call. In this manner, each of the three subscribers will have the same chance of being contacted by customers using the *PIZZA subscription code. In a variation of this approach, one of the three subscribers may receive more calls than the rest, e.g., eight out of every ten calls, if the subscriber is willing to pay a higher subscription fee. The remaining subscribers who each gets one out of every ten calls can pay a significantly lower subscription fee.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What I claim is:

1. A method for providing subscription code services, the method comprising:

allocating a plurality of subscription codes for the services;

storing the subscription codes in a look up table stored within a controller;

receiving a query for call routing instructions when a call using a subscription code is detected, the query including a translation type and the subscription code;

retrieving message containing a plurality of telephone numbers and subscribers from the look up table containing associations of the subscription code to multiple telephone numbers based at least in part on the subscription code, wherein the telephone numbers are substantially permanently assigned to the subscription code;

offering a selection of two or more subscribers corresponding to the same subscription code;

receiving a selection specifying one subscriber selected from the two or more subscribers;

determining a telephone number corresponding to the one subscriber; and terminating the call using the telephone number.

2. A method for providing subscription code services, the method comprising:

allocating a plurality of subscription codes for the services;

storing the plurality of subscription codes in a look up table resident within a controller associated with one or more call routing instructions, wherein the look up table contains associations of the subscription code to multiple telephone numbers, each telephone number being associated with a different subscriber;

receiving a query for the call routing instructions when a call using a subscription code is detected;

presenting a list of subscribers associated with the subscription code, wherein the subscription code is associated with two or more different subscribers;

receiving a selection specifying one subscriber selected from the list;

determining a telephone number corresponding to the one subscriber; and terminating the call using the telephone number.

3. The method of claim 2, wherein presenting the list of subscribers associated with the subscription code involves a prerecorded announcement.

4. The method of claim 2, wherein presenting a list of subscribers associated with the subscription code and receiving a selection specifying one subscriber from the list are performed by one or both of a service node and a switch.

5. A method for providing subscription code services, the method comprising:

allocating a plurality of subscription codes for the services;

storing the subscription codes in a look up table;

receiving a query for call routing instructions when a numerical subscription code is detected;

providing a list of subscription codes based upon the numerical subscription code, wherein the list includes two or more subscription codes that are associated with the numerical subscription code;

receiving a selection specifying one subscription code selected from the list of subscription codes;

determining a telephone number based upon the specified subscription code; and terminating the call using the telephone number.

6. A method for providing subscription code services, the method comprising:

allocating a plurality of subscription codes for the services;

storing the subscription codes in a look up table;

receiving a query for call routing instructions when a call using a numerical subscription code is detected;

presenting a list of subscription codes based upon the numerical subscription code, wherein the list includes two or more subscription codes that are associated with the numerical subscription code;

receiving a selected subscription code;

retrieving a plurality of telephone numbers from the look up table containing associations of the selected subscription code to multiple telephone numbers based at least in part on the subscription code, wherein the multiple telephone numbers are substantially permanently assigned to the subscription code and are each associated with a subscriber associated with the subscription code;

selecting one of the multiple telephone numbers associated with one of the plurality of subscribers associated with the subscription code; and terminating the call using the selected telephone number.

* * * * *